(12) United States Patent
Holzer et al.

(10) Patent No.: US 6,490,176 B2
(45) Date of Patent: Dec. 3, 2002

(54) DC/AC CONVERSION APPARATUS AND METHOD HAVING CONTACTLESS, INDUCTIVE ENERGY TRANSFER

(75) Inventors: Walter Holzer, Meersburg (DE); Rudolf Manukov, Tbilissi (GE)

(73) Assignee: Provera GmbH, Meersburgh (DE)

( * ) Notice: Subject to any disclaimer, the term of this patent is extended or adjusted under 35 U.S.C. 154(b) by 0 days.

(21) Appl. No.: 09/875,631

(22) Filed: Jun. 6, 2001

(65) Prior Publication Data

US 2002/0141215 A1 Oct. 3, 2002

(30) Foreign Application Priority Data

Mar. 28, 2001 (DE) .......................................... 101 15 535

(51) Int. Cl.[7] .............................................. H02M 3/335
(52) U.S. Cl. .......................................... 363/20; 363/131
(58) Field of Search .............................. 363/16, 17, 20, 363/21.01, 95, 98, 131, 132

(56) References Cited

U.S. PATENT DOCUMENTS

| | | | | |
|---|---|---|---|---|
| 5,747,894 A | * | 5/1998 | Hirai et al. | 307/104 |
| 5,940,280 A | * | 8/1999 | Murai et al. | 363/17 |
| 6,134,130 A | * | 10/2000 | Connell et al. | 363/89 |
| 6,301,128 B1 | * | 10/2001 | Jang et al. | 363/17 |

* cited by examiner

*Primary Examiner*—Adolf Deneke Berhane
(74) *Attorney, Agent, or Firm*—Marshall, Gerstein & Borun

(57) ABSTRACT

A DC/AC converter is provided for contactless, inductive transfer of energy, which transfers arbitrary voltages to a removable user with the aid of a high-frequency pulse generator. The pulse generator produces asymmetric pulses, which provides two different voltages to the user, depending on a to coupling orientation. Further, the pulse generator is built in such a way that, if a user is absent, it is not excited to oscillation and, as a result, uses substantially no energy at all in a stand-by operation.

27 Claims, 3 Drawing Sheets

DC/AC CONVERSION APPARATUS AND METHOD HAVING CONTACTLESS, INDUCTIVE ENERGY TRANSFER

FIELD OF THE INVENTION

The present invention relates generally to DC/AC conversion with contactless, inductive energy transfer and, more specifically, contactless, inductive energy transfer through a specific magnetic coupling between the energy producer and energy consumer.

BACKGROUND OF THE INVENTION

Contactless, inductive energy transfer is known in the art as a convenient way to transfer energy. Specific applications using contactless energy transfer include battery charging devices such as are described in EP 0 666 805 B and EP 0 509 125 B1, for example. In EP 0 666 805 B1, in particular, a battery charging device is disclosed for automatic, contactless charging wherein relatively high amounts of energy are transferred. In some applications, however, it is desirable to transfer differing amounts of energy. In a battery charging device, for example, it is desirable to provide rapid charging of batteries, as well as slower, protective charging to increase the life of secondary batteries.

However, providing two or more differing amounts of energy transfer in contactless inductive systems of the prior art is not achieved simply and reliably with low cost.

An example of systems that provide differing amounts of energy transfer include the utilization of pulse generators. In particular, one-transistor pulse generators that are self-oscillating such as a three-point clocking oscillator, may operate stably by correct selection of components to produce rectangular pulses where the pulse width is asymmetric. By half-wave rectifying the asymmetric positive or negative pulse, two differing energy levels may be obtained based on the direction of rectification.

SUMMARY OF THE INVENTION

In order to solve the problems of the prior art, specific contactless transfer of relatively low energies through magnetic coupling is disclosed, especially for applications where simple operation, safety, cost factor and reliability are important.

In particular, a DC/AC converter is disclosed having contactless energy transfer, where, using an asymmetric pulse with subsequent rectifying and pole reversal in a secondary mobile user circuit, either a high energy or low energy charging may be selected by a user. Additionally, when no user is inductively coupled, there is only a very slight power dissipation in the pulse generator, because its oscillation is prevented. This feature is provided by using a pulse generator oscillating with an "asymmetric pulse" in the primary circuit where the pulse generator is comprised of a stationary portion having an E-shaped magnetic core having two coils each having respective "asymmetric pulses" that are transferred inductively to the secondary mobile user circuit. Dependent on how the secondary mobile user circuit is placed in relation to the E-shaped magnetic core, either a high or a low energy is produced.

A further advantage of the disclosed apparatus and method effected according to the teachings of the invention is the contactless transfer of energy and automatic selection of the voltage level for different applications by, providing mobile user circuits with corresponding windings, depending on the desired voltage. As a result, the same pulse generators can be used universally for several user circuits having different voltage level requirements.

According to an embodiment, a DC/AC converter system is provided having contactless, inductive energy transfer. The system comprises an electronic high-frequency pulse generator including a first magnetic core coupled with a primary winding. In addition, the system includes a user circuit configured to inductively couple with the electronic high-frequency pulse generator, the user circuit including a second magnetic core coupled with an associated secondary winding. The second magnetic core is configured to magnetically couple with the first magnetic core when it is placed in one of at least two predetermined positions with respect to the first magnetic core. A corresponding prescribed level of energy transfer results for each of the at least two predetermined positions.

According to another embodiment, a method of using a DC/AC converter system for contactless, inductive energy transfer, includes providing an electronic high-frequency pulse generator including a first magnetic core coupled with a primary winding. A user circuit is provided and configured to inductively couple with the electronic high-frequency pulse generator and includes a second magnetic core coupled with an associated secondary winding. The second magnetic core is configured to magnetically couple with the first magnetic core when placed in one of at least two predetermined positions of with respect to the first magnetic core and a corresponding prescribed level of energy transfer results for each of the at least two predetermined positions.

DESCRIPTION OF THE PREFERRED EMBODIMENTS

Figure 1:
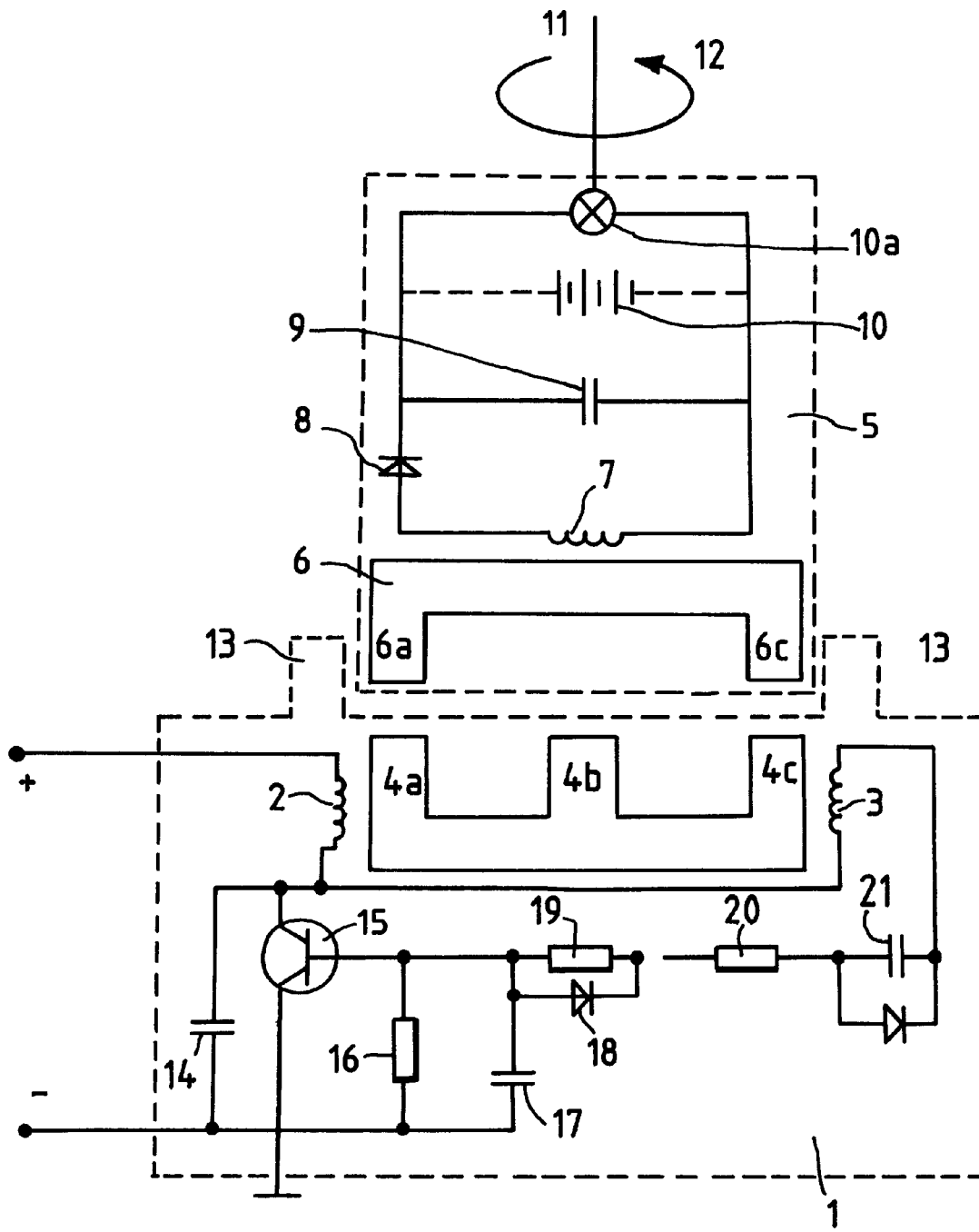
FIG. 1 is a schematic block diagram of a charging device with contactless energy transfer including an incandescent lamp is included in a user circuit.

FIG. 1 shows a DC/AC conversion system for battery charging having a high-frequency pulse generator 1 using a blocking-oscillator configuration and a user circuit 5, that are inductively and contactlessly coupled to one another via coils 2, 3 and 7. Primary coil 2 and sensing coil 3 are respectively arranged on outer poles 4a and 4c of a stationary three-pole E-shaped magnetic core 4. The mobile user circuit 5 includes a secondary coil 7 on a magnetic core 6, a rectifier diode 8 and a charging capacitor 9, which is electrically connected to a rechargeable second battery 10. Secondary coil 7 is arranged on a movable magnetic core 6 that is removable and forms a magnetic bridge shunt with reference to the E-shaped magnetic core 4 when placed in proximity. As a result of the close proximity of magnetic core 6, an electromotive force occurs in the E-shaped magnetic core 4 which results in the increased magnetic coupling of coils 2 and 3 such that the pulse generator begins to oscillate.

The pulse generator 1 is shown schematically as a high-frequency oscillator, which is configured oscillates with an "asymmetric pulse". That is, the pulse width 26 and the pause length 23 are different as illustrated in the oscillogram of FIG. 2.

In a preferred embodiment, rectifier diode 8 is connected in series with the battery 10, the diode 8 performing a half-wave rectification, where a higher or a lower charging current may be obtained, dependent on the particular orientation placement of the magnetic core 6 with respect to the E-shaped magnetic core 4. Additionally, it is noted that no switching is necessary. Instead, the two current stages (i.e., high and low charging currents) arise via a position-dependent positioning of the magnetic core 6 with respect to the E-shaped magnetic core 4. Thus, it is possible for any arbitrary battery to be charged with either a low charging current or with a higher charging current for rapid changing. An advantage of using the lower charging current is that it effects a protective charging, which may increase the life of batteries by up to four times.

As an example of the positioning of the magnetic core 6, if one imagines a rotary axis 11, the magnet core 6 can be rotated around the axis 11 in the direction of arrow 12, for example, by substantially 180°, so that it can be placed in the opposite direction with respect to the E-shaped magnetic core 4. The correct positioning of the magnetic core 6 on the E-shaped magnetic core 4 is accomplished by a guide element 13 present on the housing of the DC/AC converter. The guide element 13 shown is merely exemplary, but also may be comprised of a channel, slot, pin, tab or any other means for accomplishing a prescribed alignment or positioning.

Figure 2:
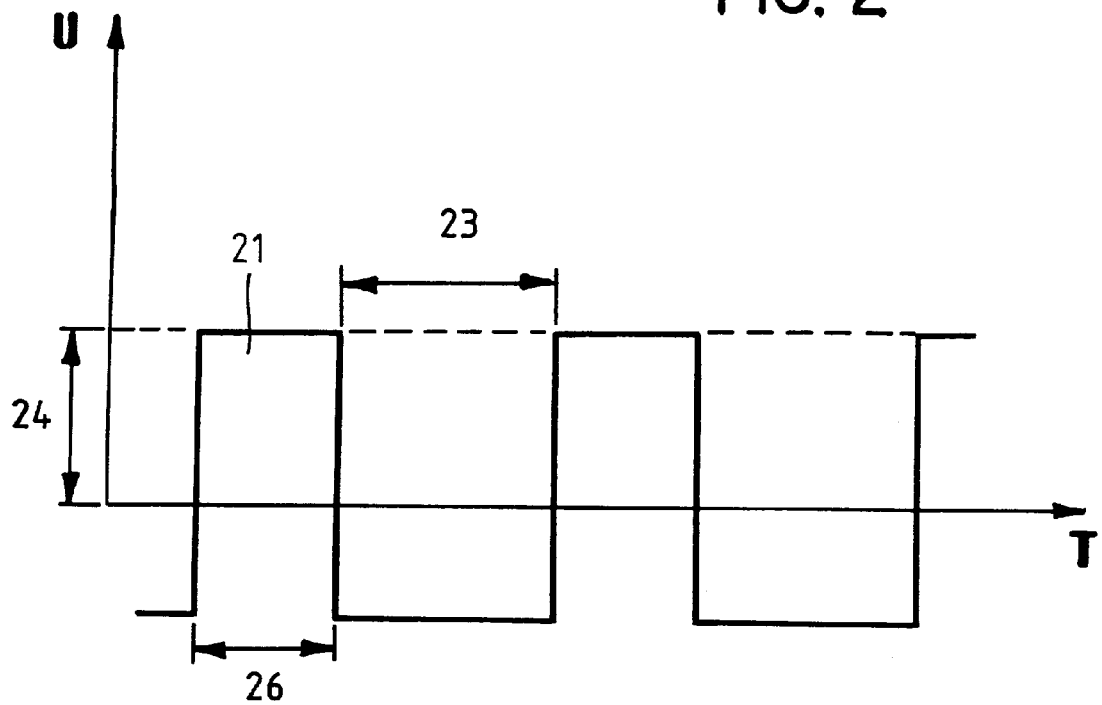
FIG. 2 is a oscillogram of a voltage waveform across a user winding in the circuit of FIG. 1 in a high-energy transfer mode.
Figure 3:
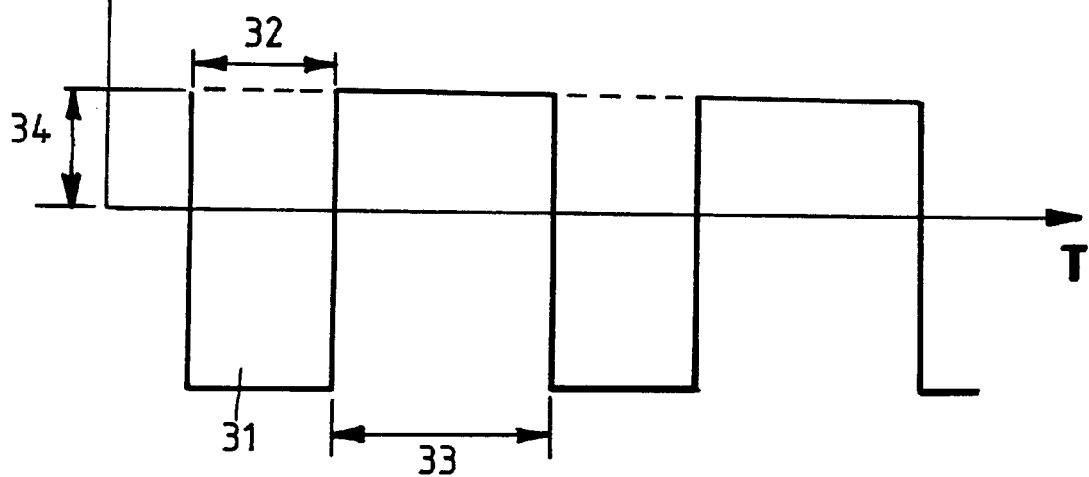
FIG. 3 is a oscillogram of a voltage waveform across the user winding in the circuit of FIG. 1 in a low-energy transfer mode.

FIGS. 2 and 3 illustrate the different charging voltages of rapid and protective charging modes, respectively. In FIG. 2, the charging voltage 24 across the user winding 7 is shown in the rapid-charging mode. FIG. 3 illustrates the charging voltage 34 across the user winding 7 when in the protective charging (i.e., the magnetic core 6 is disposed at 180° from the rapid charging position). As can be seen, the voltage 24 is greater than voltage 34.

In order to illustrate the rapid charging mode and the protective charging mode, the oscillograms shown in FIGS. 2 and 3 are measured at the user winding 7, by placing an incandescent lamp 10a in the user circuit 5 instead of battery 10. Measurement with a connected battery 10 would only show the DC voltage at battery 10. With a connected battery 10, it is obvious from the oscillograms according to FIGS. 2 and 3 that the charging current of the battery is higher in the first case than in the second case, so that one obtains rapid charging in one case and protective charging in the other case.

Using the pulse generator mentioned above, the duty cycle or factor of the pulse widths 25 and 32 and the pause lengths 23 and 33 can be adjusted, whereupon, in the practical example shown in FIGS. 2 and 3, an "asymmetric pulse" is produced. The voltage curves shown in FIGS. 2 and 3 have practically a mirror image symmetry, since the pulse width 25 of FIG. 2 is equal to the pause length 32 of the waveform of FIG. 3. Similarly, the pause length 23 of FIG. 2 corresponds to the pulse width 33 of FIG. 3.

Another characteristic of the disclosed DC/AC converter system is that the pulse generator begins to oscillate when a corresponding load is applied in the form of the user circuit 5. That is, oscillation of the electronics of the pulse generator occurs only when the magnetic circuit between the magnetic cores 4 and 6 is closed.

In the stationary portion (i.e., the high-frequency pulse generator) of the DC/AC converter system, there are two elements that provide the stable stand-by mode: (1) the three-pole E-shaped magnetic core 4, preferably made of a ferrite material; and (2) the electrical circuit comprised of capacitor 17, diode 18 and resistor 19, which is a high-frequency filter.

Figure 4:
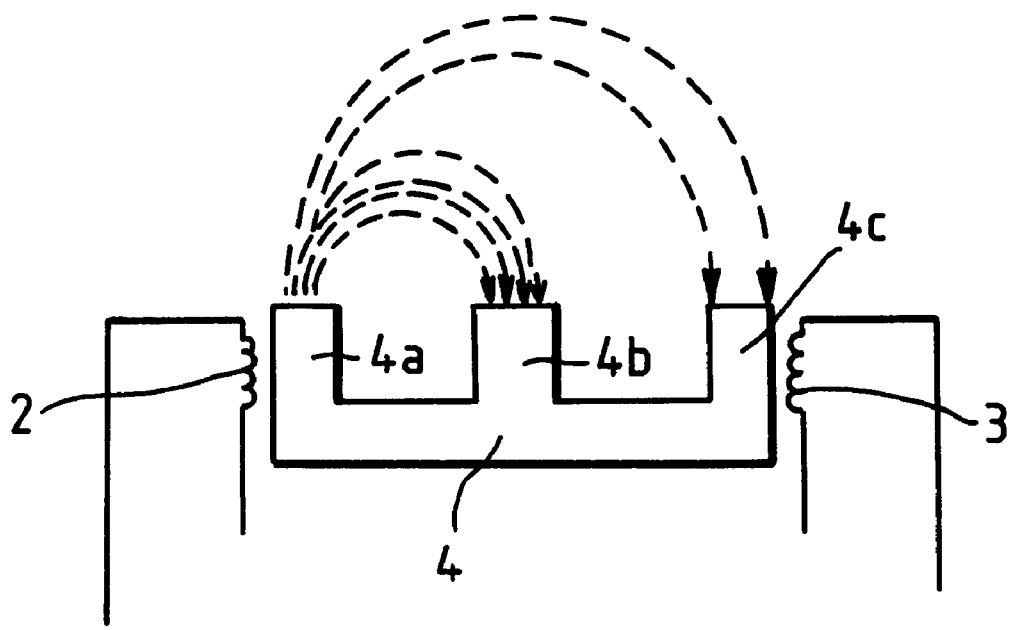
FIG. 4 illustrates the magnetic leakage flux of an E-shaped magnetic core in the circuit of FIG. 1 when a corresponding magnet core is removed.

When the pulse generator 1 oscillates, pole 4b of the E-shaped magnetic core 4 has no influence at all on the pulse generator. However, it is positioned to remove the magnetic core 6 from the E-shaped magnetic core 4 in order to interrupt the energy transfer to coil 7, the induction and the magnetic coupling between coils 2 and 3 is reduced and the oscillation of the pulse generator stops. The middle pole 4b of the E-shaped magnetic core 4 substantially precludes magnetic coupling between poles 4a and 4c because the leakage flux is concentrated onto poles 4a and 4b as a result of the shorter distance. Consequently, the leakage flux between the poles 4a and 4c is reduced to a minimum, as illustrated by the lesser amount of magnetic field lines extending to pole 4c in FIG. 4. This reduction in leakage flux makes it possible to continuously keep the DC/AC converter in readiness. The no-signal current of the pulse generator, which is determined by the resistor 16, is necessary for starting the oscillation again.

Figure 5:
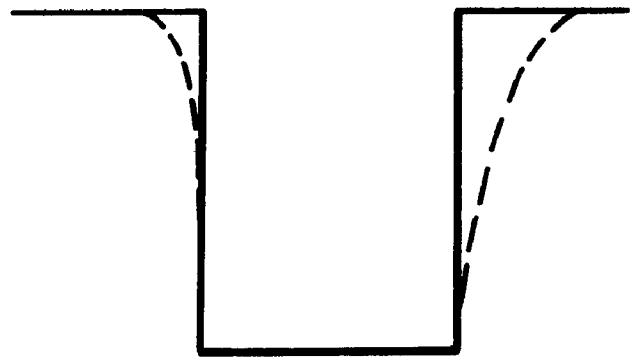
FIG. 5 shows the oscillogram of a voltage waveform across a winding magnetically coupled the E-shaped magnetic core in the circuit of FIG. 1.

A stand-by circuit is included in the pulse generator 1 that is comprised of the capacitor 17, resistor 19 and diode 18, which is a high-frequency filter ensuring that when pulses are transferred from the feedback coil 3 to the base of transistor 15 via the filter circuit. As a result of the filter, the back side of each rectangular pulse falls gradually while the front side remains substantially unchanged as a rectangular pulse shape as illustrated in FIG. 5. As a result, the subsequently increased oscillation is stopped because of the reduction of the inductive connection between the coils 2 and 3 of the pulse generator, which occurs after the removal of the magnetic core 6 from proximity with the E-shaped magnetic core 4 and, thus, the pulse generator assumes an improved stand-by mode.

The resistor 20 and capacitors 14 and 21 are typical components of common blocking oscillators, such as the circuit in FIG. 1. The RC time constant of the resistor 20 and capacitor 21 determine the switch-on time and switch-off time of the pulse generator. The diode 22 makes it possible to improve the opening time of the transistor 15 (i.e., shorten the switching time) and, thus, the efficiency of the entire circuit, is increased.

A DC/AC converter system constructed according to the teachings of the invention allows the magnetic core 6 to be provided with different windings for different voltages, such that different voltages may be provided by the same charging equipment. Furthermore, the same charging equipment may be used for many different applications such as mobile telephones, electric shavers, batteries for video cameras, toys, electrical flashlights, etc. As another exemplary application, a fluorescent lamp, operating at 200–300 volts, may be operated.

The disclosed apparatus constructed according to the teachings of the invention makes it possible to construct contactless, inductive DC/AC converters that are miniaturized, safe, cost-effective, reliable and handy that may be used also in aqueous, aggressive and explosive media.

Alternatively, it will be appreciated by those of ordinary skill in the art that a DC/AC converter constructed according to the teachings of the invention may also be operated from an AC power source and the stand-by mode may also be effected with success in such an arrangement.

Although certain examples have been described herein, the scope of the coverage of this patent is not limited thereto. On the contrary, this patent covers all examples fairly falling within the scope of the appended claims, either literally or under the doctrine of equivalents.

What is claimed is:

1. A DC/AC converter system having contactless, inductive energy transfer comprising:
    an electronic high-frequency pulse generator including a first magnetic core coupled with a primary winding; and
    a user circuit configured to inductively couple with the electronic high-frequency pulse generator without contact, the user circuit including a second magnetic core coupled with an associated secondary winding; wherein the second magnetic core is configured to magnetically couple with the first magnetic core is at least two predetermined positions with respect to the first magnetic core and distinct corresponding prescribed levels of energy transfer result for each of the at least two predetermined positions.

2. The DC/AC converter system according to claim 1, wherein the at least two predetermined positions of the first magnetic core with respect to the second magnetic core coupled with the secondary winding differ substantially from each other by an angle of 180 degrees around one axis of rotation.

3. The DC/AC converter system according to claim 1, further comprising:
    a housing that houses electronic high-frequency pulse generator;
    one or more guide elements disposed on the housing that are configured to facilitate the at least two predetermined positions of the first magnetic core with respect to the second the magnetic core.

4. The DC/AC converter system according to claim 1, wherein the second magnetic core and secondary winding are detachable such that any one of a plurality of second magnetic cores each having a different corresponding secondary winding for contactless energy transfer may be attached in the user circuit.

5. The DC/AC converter system according to claim 4, wherein the one or more guide elements are configured to permit a limited rotation of the first magnetic core with respect to the second magnetic core around at least one axis of rotation.

6. The DC/AC converter system according to claim 1, further comprising:
    the electronic pulse generator having the primary winding and a feedback winding respectively disposed on a corresponding outer pole of the first magnetic core, such that when the second magnetic core is removed, a leakage flux is produced between one of the two outer poles of the first magnetic core and a middle pole of the first magnetic core that decouples the primary coil and the feedback coil.

7. The DC/AC converter system according to claim 1, further comprising:
    the electronic high-frequency pulse generator including a stand-by circuit comprised of a high-frequency filter circuit including a capacitor, a diode and a resistor that is configured to stabilize the stand-by circuit.

8. The DC/AC converter system according to claim 1, wherein the electronic high-frequency pulse generator is configured to generate pulses having a prescribed duty cycle.

9. The DC/AC converter system according to claim 8, wherein the prescribed duty cycle is an asymmetric duty cycle configured such that a first energy transfer level occurs when the first magnetic core is placed in a first position of the at least two predetermined positions relative to the second magnetic core and a second energy transfer level occurs when the first magnetic core is placed in a second position of the at least two predetermined positions relative to the second magnetic core.

10. The DC/AC converter system according to claim 1, further comprising:
    the user circuit including a series connection of a load and half-wave rectifier;
    wherein the series connection is connected in series with the secondary winding such that a DC/AC/DC converter system is produced.

11. The DC/AC converter system according to claim 10, wherein the load is a rechargeable battery that is charged by the DC/AC/DC converter system.

12. The DC/AC converter system according to claim 1, wherein the first magnetic core is E-shaped having at least three poles.

13. The DC/AC converter system according to claim 1, further comprising:
    a sensing winding coupled to the first magnetic core that is configured to provide a rectangular pulse signal in the first magnetic core to a base terminal of a switching transistor that is used to effect the rectangular pulse signal.

14. A method of using a DC/AC converter system for contactless, inductive energy transfer, the method comprising:
    providing an electronic high-frequency pulse generator including a first magnetic core coupled with a primary winding; and
    providing a user circuit configured to inductively couple with the electronic high-frequency pulse generator without contact, the user circuit including a second magnetic core coupled with an associated secondary winding;
    wherein the second magnetic core is configured to magnetically couple with the first magnetic core in at least two predetermined positions with respect to the first magnetic core and distinct corresponding prescribed levels of energy transfer result for each of the at least two predetermined positions.

15. The method according to claim 14, wherein the at least two predetermined positions of the first magnetic core with respect to the second magnetic core coupled with the secondary winding differ substantially from each other by an angle of 180 degrees around one axis of rotation.

16. The method according to claim 14, further comprising:
    providing a housing that houses electronic high-frequency pulse generator; and
    disposing one or more guide elements on the housing that are configured to facilitate the at least two predetermined positions of the first magnetic core with respect to the second the magnetic core.

17. The method according to claim 14, wherein the second magnetic core and secondary winding are detachable such that any one of a plurality of second magnetic cores each having a different corresponding secondary winding for contactless energy transfer may be attached in the user circuit.

18. The method according to claim 17, wherein the one or more guide elements are configured to permit a limited rotation of the first magnetic core with respect to the second magnetic core around at least one axis of rotation.

19. The method according to claim 14, further comprising:

respectively disposing the primary coil and a feedback coil on outer poles of the first magnetic core, such that when the second magnetic core is removed, a leakage flux is produced between one of the two outer poles of the first magnetic core and a middle pole of the first magnetic core that decouples the primary coil and the feedback coil.

20. The method according to claim 14, further comprising:

providing the electronic high-frequency pulse generator with a standby circuit comprised of a high-frequency filter circuit including a capacitor, a diode and a resistor that is configured to stabilize the stand-by circuit.

21. The method according to claim 14, further comprising:

generating pulses having a prescribed duty cycle using the electronic high-frequency pulse generator.

22. The method according to claim 21, wherein the prescribed duty cycle is an asymmetric duty cycle configured such that a first energy transfer level occurs when the first magnetic core is placed in a first position of the at least two predetermined positions relative to the second magnetic core and a second energy transfer level occurs when the first magnetic core is placed in a second position of the at least two predetermined positions relative to the second magnetic core.

23. The method according to claim 14, further comprising:

providing a series connection of a load and half-wave rectifier in the user circuit;

wherein the series connection is connected in series with the secondary winding such that a DC/AC/DC converter system is produced.

24. The method according to claim 23, wherein the load is a rechargeable battery that is charged by the DC/AC/DC converter system.

25. The method according to claim 22, wherein the first and second levels of energy transfer are fast and slower battery charging currents, respectively.

26. The method according to claim 14, wherein the first magnetic core is E-shaped having at least three poles.

27. The method according to claim 14, further comprising:

providing a sensing winding coupled to the first magnetic core that is configured to provide a rectangular pulse signal in the first magnetic core to a base terminal of a switching transistor that is used to effect the rectangular pulse signal.

* * * * *

UNITED STATES PATENT AND TRADEMARK OFFICE
CERTIFICATE OF CORRECTION

PATENT NO.   : 6,490,176 B2
DATED        : December 3, 2002
INVENTOR(S)  : Walter Holzer et al.

It is certified that error appears in the above-identified patent and that said Letters Patent is hereby corrected as shown below:

<u>Title page,</u>
Item [57], ABSTRACT,
Line 6, replace "a to coupling" with -- a coupling --.

<u>Column 5,</u>
Line 22, replace "is" with -- in --.
Line 40, replace "the second the magnetic" with -- the second magnetic --.

Signed and Sealed this

Nineteenth Day of August, 2003

JAMES E. ROGAN
*Director of the United States Patent and Trademark Office*